Nov. 27, 1951     O. J. POUPITCH     2,576,890
THREAD GRIPPING LOCK NUT
Filed July 22, 1949
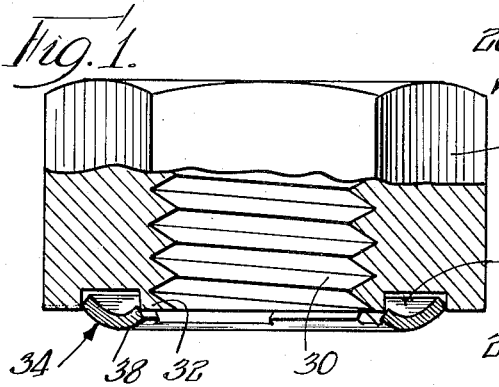
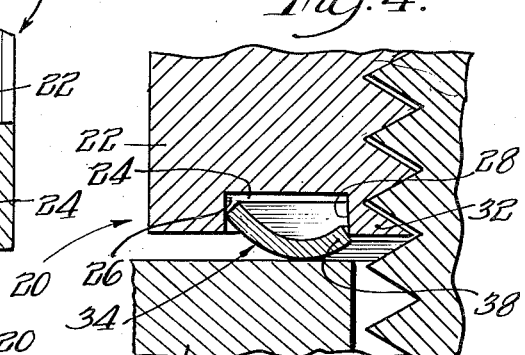
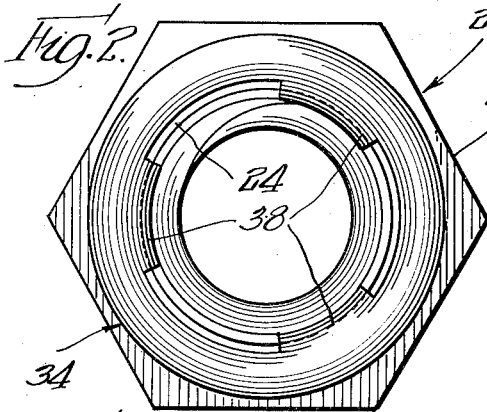
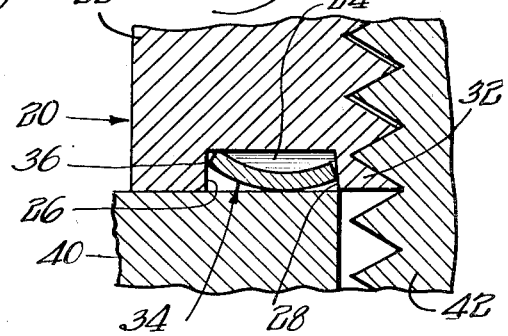
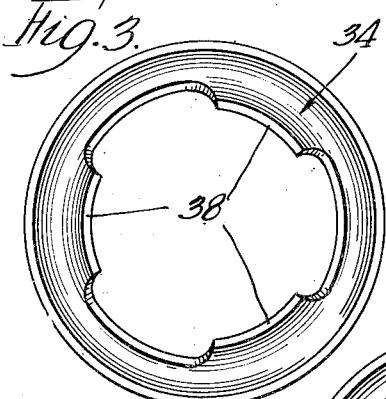
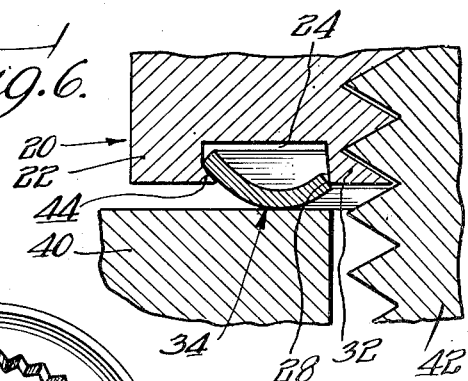
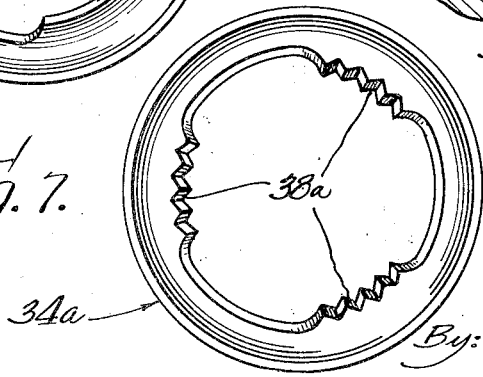
INVENTOR.
Ougljesa Jules Poupitch
By: Moore Olson & Trexler
Attys Patented Nov. 27, 1951

2,576,890

UNITED STATES PATENT OFFICE 2,576,890

THREAD GRIPPING LOCK NUT

Ougljesa Jules Poupitch, Chicago, Ill., assignor to Illinois Tool Works, Chicago, Ill., a corporation of Illinois Application July 22, 1949, Serial No. 106,252

4 Claims. (Cl. 151—19)

This invention relates generally to fastener units, and more particularly to fastener units consisting of an internally threaded element such as a nut and a washer carried as a unit on the clamping side thereof, adapted to effect locking impingement of the internal thread of the nut with a complementary screw member when the unit is tightened against a work surface.

More specifically, the present invention contemplates an improved nut and washer assembly in which the nut is provided on its clamping side with an annular section of limited size capable of being sprung into locking impingement with a complementary screw member as an incident to the clamping engagement of the crest of a washer body of arcuate cross-section.

The invention proposes the use in the fastener unit referred to above of a washer element of arcuate radial cross-section which functions as a strut between inner and outer abutments when the fastener unit is tightened against a work surface, whereby to cause a resilient locking section of the nut to be shifted into engagement with the thread convolutions of a complementary screw member.

It is a further object of the present invention to provide a fastener unit having a nut and washer structure of the type referred to above which may be produced very economically and which incorporates the simple expedient of an annular recess on the clamping side of a nut member designed to accommodate a washer body between the opposite walls defining said recess.

The foregoing and other objects and advantages will be more apparent from the following detailed description, when considered in connection with the accompanying drawings, wherein—

Fig. 1 is a side elevational view shown partly in section which illustrates one embodiment of a fastener unit or combined nut and washer member contemplated by the present invention;

Fig. 2 is a plan view of the underside of the assembly shown in Fig. 1;

Fig. 3 is a plan view of the washer member of Fig. 1 detached from the nut member;

Fig. 4 is an enlarged fragmentary sectional view corresponding with the lower left hand portion of the fastener unit shown in Fig. 1, said view illustrating the relative position of the washer nut and work surface just prior to the final tightening of the washer member against the work;

Fig. 5 illustrates the position assumed by the washer member after the fastener unit has been tightened in position, and shows the manner in which the inner margin of the washer member urges the adjacent thread convolution of the nut into locking impingement with the complementary thread convolution on the screw member;

Fig. 6 is a sectional view similar to Fig. 4, illustrating the manner in which a flange formed beneath the washer may be employed to secure the washer against axial separation with respect to the nut; and Fig. 7 is a plan view similar to Fig. 3, illustrating the use of serrations along those portions of the inner margin of the washer which engage the wall or periphery of the annular locking section of the nut.

Referring now to the drawings wherein like numerals have been employed to designate similar parts throughout the various figures, it will be seen that one embodiment of the present invention is illustrated by the fastener unit designated generally by the numeral 20, Figs. 1 to 5, inclusive. This fastener unit consists of an internally threaded nut or fastener member 22 provided with an annular lock washer accommodating groove 24 on the clamping side thereof. One side of the groove 24 is defined by an annular wall 26, and the opposite side by an annular wall 28. The nut 22 is provided with conventional internal threads 30, and due to the presence of the annular groove 24 an annular nut section 32 of limited cross-section is provided which includes as a part thereof the thread convolution adjacent the clamping side of the nut. In fact, the thickness of the nut stock in the vicinity of the annular section 32 is such as to facilitate inward shifting thereof for locking purposes in a manner about to be described.

The aforesaid inward shifting of the annular nut section 32 is accomplished by the use of an annular washer member designated generally by the numeral 34. In the embodiment disclosed in Figs. 1 to 5, inclusive, this washer member 34 is formed from suitable sheet metal stock. The body of the washer is of toric form and the diameter of its outer edge or margin 36 is normally slightly greater than the diameter of the wall 26. Thus, when the outer margin of the washer 34 is forced into the annular groove 34, the frictional engagement between the washer edge 36 and the walls 26 and 28 is sufficient to secure the washer and nut together as an operable unit.

The inner margin of the washer is provided with three circumferentially spaced teeth or lugs 38. It will be noted that the inner circumferentially disposed edges of the lugs 36 terminate in the immediate vicinity of the lower portion of the annular nut section 32, Figs. 1 and 4, prior to the final tightening of the fastener unit against a work surface. This is best illustrated in Fig. 4 which shows the inner margin or edge of one of the prongs 38 positioned immediately adjacent a corner of the annular nut section 32. When in this position the arcuate body of the washer 34 is spaced well beyond the normal clamping surface of the nut body.

In Fig. 4 the fastener unit is shown with the arcuate body of the washer touching the surface of a work piece 40 just prior to the tightening of the fastener unit in final clamping position. As the nut 22 is rotatably tightened from the position shown in Fig. 4 to the position of Fig. 5, the inner circumferential margins of the lugs or prongs 38 are forced into the annular recess 24 along the surface of the annular wall 28. The tendency of the spring washer 34 to flatten causes pressure to be exerted against the opposite annular wall surfaces 26 and 28. This causes the annular section 32 to be urged inwardly so as to effect locking impingement of the thread convolution in that section with the complementary thread convolution of the screw 42. The annular section of the nut engaged by the outer margin or edge 36 of the washer is rigid, and hence will not yield in response to pressure exerted by the washer during the flattening thereof. The increased frictional resistance between the thread convolution in the annular nut section 32 and the complementary thread convolution of the screw 42 is sufficient to lock the nut against unauthorized or inadvertent loosening. In addition to the above mentioned locking action, the underside of the spring washer member 34 engages the complementary surface of the work 40 so as to establish additional resistance to loosening. The nut and washer structure may be so designed as to permit engagement of the clamping surface of the nut against the work piece when it is finally tightened in position.

In Fig. 7 a lock washer 34a of slightly modified form is shown. This lock washer 34a is structurally similar to the lock washer 34 except that it incorporates serrations 38a along its inner margin. These serrations serve to increase the aggressiveness with which the inner margin of the washer bites into or impinges the annular locking section 32. In instances where it may be desirable, the washer 34 may be secured against separation with respect to the nut by means of a flange 44, Fig. 6.

From the foregoing it will be apparent that the present invention contemplates a novel and practical preassembled nut and washer unit capable of being produced by the practice of conventional and economical manufacturing methods. It will also be clear that this invention is particularly applicable in instances where resilient washer members of toric form stamped from sheet metal stock are employed. The stock of these washer members functions as a strut between the outer periphery of the annular locking section of the nut and the shoulder spaced radially outward therefrom. That is to say, any tendency for the washer stock of arcuate or bowed cross-section to flatten causes it to function as a toggle or strut, thereby exerting pressure inwardly along uniformly distributed areas of the periphery of the locking section of the nut. By having the washer member secured against axial separation from the nut member, a simple and practical unitary device is presented which precludes the necessity of handling the two parts of the unit separately.

While for purposes of illustration certain structural features have been disclosed, it will be apparent that the invention is capable of other modifications and changes without departing from the spirit and scope of the invention.

The invention is hereby claimed as follows:

1. A fastener unit comprising a nut, a radially yieldable annular locking section integral with the nut at the clamping side thereof and coaxial with the threaded opening therethrough, an annular sheet metal washer having inner and outer margins relatively spaced axially with respect to one another and defining an intermediate body portion therebetween, shoulder means on the clamping side of the nut spaced outwardly from said locking section, the intermediate body portion of the washer being gradually curved between the inner and outer margins with the convex surface thereof normally extending axially beyond the clamping face of the nut to provide a work engaging surface with the outer margin of the washer disposed adjacent said shoulder means to limit movement thereof and with the inner margin of the washer spaced axially from the outer margin and toward the clamping face of the nut and disposed adjacent the free extremity of said locking section, the inner margin of said washer presenting lug surfaces spaced circumferentially thereabout and the axially deflected body portion of the washer being stressed against the work surface when the nut is tightened for urging the spaced lug surfaces of the inner margin of the washer inwardly against the locking section adjacent the free extremity thereof whereby to urge the locking section radially into binding engagement with the threads of a complemental threaded fastening element.

2. A fastener unit as claimed in claim 1, wherein the spaced lug surfaces are provided with serrations to engage the annular locking section.

3. A fastener unit comprising a nut having an annular recess substantially rectangular in cross section and of greater width than depth in the clamping face thereof around the threaded opening therethrough, said recess presenting shoulder means around the outer periphery thereof and an inner depending annular locking section coaxial with the threaded opening through the nut with at least the free end portion thereof being radially yieldable, and an annular sheet metal axially resilient washer of arcuate cross section disposed in said recess and presenting an outer margin spaced axially inwardly of the nut with respect to the inner margin and adapted to be positioned adjacent said shoulder means, the inner margin of the washer being disposed adjacent the end portion of said locking section and the intermediate exterior arcuate surface of the washer normally extending axially beyond the clamping face of the nut to provide a work engaging surface to be clamped and stressed against the work surface when the nut is tightened for urging the inner margin of the washer inwardly against the end portion of the locking section with the outer margin of the washer impinged against said shoulder means and restrained against axial movement thereby providing a resilient strut for urging the end portion of the locking section radially into binding engagement with the threads of a complemental threaded fastening element and permitting engagement of the clamping face of the nut with a complemental work surface.

4. A fastener unit as claimed in claim 3, wherein the nut has swaged protuberant means underlying the outer margin of the washer for retaining the washer in preassembled association with the nut and shoulder means.

OUGLJESA JULES POUPITCH.

REFERENCES CITED

The following references are of record in the file of this patent:

UNITED STATES PATENTS

| Number | Name | Date |
|---|---|---|
| 985,826 | McLaughlin | Mar. 7, 1911 |
| 1,795,570 | Nilson | Mar. 10, 1931 |